(12) United States Patent
Imura et al.

(10) Patent No.: US 6,239,856 B1
(45) Date of Patent: May 29, 2001

(54) LIQUID CRYSTAL PANEL AND ITS MANUFACTURING METHOD

(75) Inventors: Hideyuki Imura, Kanazawa; Kiyohiro Kawasaki, Hirakata, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/300,426

(22) Filed: Apr. 28, 1999

(30) Foreign Application Priority Data

Apr. 28, 1998 (JP) .................................................. 10-119301

(51) Int. Cl.⁷ ....................................................... G02F 1/13
(52) U.S. Cl. ................................................................ 349/192
(58) Field of Search ................................................ 349/192

(56) References Cited

U.S. PATENT DOCUMENTS 5,473,452  12/1995  Shin .
5,636,042   6/1997  Nakamura et al. .
5,771,082   6/1998  Chaudet et al. .

FOREIGN PATENT DOCUMENTS

| 3-209422 | 9/1991 | (JP) . |
| 3-265820 | 11/1991 | (JP) . |
| 4-178622 | 6/1992 | (JP) . |
| 5-241189 | 9/1993 | (JP) . |
| 7-28052 | 1/1995 | (JP) . |
| 7-181438 | 7/1995 | (JP) . |

*Primary Examiner*—James A. Dudek
(74) *Attorney, Agent, or Firm*—Parkhurst & Wendel, LLP

(57) ABSTRACT

A metal thin film by laser CVD, or an opaque film 30, by micro-jet application of an organic resin containing either one or both of black pigment and dye, is formed on the outer side of a substrate 200 or a substrate 900 at a position corresponding to a light point defect detected in image inspection after panel assembling step or after mounting step, to convert into a black point, and therefore by converting the light point defect into a black point, the yield is enhanced.

16 Claims, 11 Drawing Sheets

1

LIQUID CRYSTAL PANEL AND ITS MANUFACTURING METHOD

FIELD OF THE INVENTION

The present invention relates to a liquid crystal panel having an image display function and a method of manufacturing the same.

BACKGROUND OF THE INVENTION

Owing to the recent progress in micro-processing technology, liquid crystal material technology and mounting technology, liquid crystal panels of 5 to 50 cm in diagonal size are commercially presented as practicable display devices of television image and various images. Color display is also realized easily by forming coloring layers of R, G, B in one of the two glass substrates for composing a liquid crystal panel. In particular, in the so-called active type liquid crystal panel having switching elements incorporated in each pixel, images of small crosstalk, fast response, and high contrast ratio are guaranteed.

In such liquid crystal panels, the matrix is generally composed of 100 to 1,000 scanning lines and 200 to 2,000 signal lines, but lately trends for larger screen size and higher definition are promoted simultaneously.

FIG. 8 shows a mounting state on a liquid crystal panel in a prior art. This liquid crystal panel 1 is realized by various mounting methods, such as COG (chip on glass) method in which a semiconductor integrated circuit chip 3 for supplying drive signals is directly connected to an electrode terminal group 6 of scanning lines formed on one transparent insulating substrate (for example, glass substrate) 2, or TCP (tape carrier package) method in which a TCP film 4 having terminals (not shown) of gold-plated copper foils are fixed to a terminal group 5 of signal lines by pressing with an adequate adhesive containing a conductive medium, using, for example, a polyimide resin thin film as the base, and therefore electric signals are supplied into the image display unit. In the drawing, two mounting methods are shown simultaneously, but actually either method is selected appropriately.

Reference numerals 7 and 8 are wiring routes for connecting between the image display unit of the liquid crystal panel 1 and electrode terminal groups 5 and 6 of signal lines and scanning lines, and they may not be always composed of same conductive materials as the electrode terminal groups 5 and 6.

Reference numeral 9 is other transparent insulating substrate (for example, glass substrate) having a counter electrode of transparent conductivity common to all liquid crystal cells. Two substrates 200 and 900 for composing the liquid crystal panel 1 are disposed at a specified gap of about several microns through a spacer member such as resinous fiber or bead. This gap is a closed space as being closed by a seal member and a stopping member made of organic resin in the peripheral parts of the substrates 200, 900, and this closed space is filled with liquid crystal.

To realize a color display, generally, the closed space side of the glass substrate 9 is coated with an organic thin film in a thickness of about 1 to 2 µm containing either one or both of dye and pigment called coloring layer, and a color display function is provided, and in such a case the color substrate 900 is particularly called "color filter substrate." Depending on the properties of liquid crystal material, a polarizer is adhered to either one or both of the upper surface of the glass substrate 9 and the lower surface of the glass substrate 2, and the liquid crystal panel 1 functions as an electro-optic element. A general twisted nematic (TN) liquid crystal requires two polarizers.

FIG. 9 is an equivalent circuit diagram of an active type liquid crystal panel having, for example, thin film insulating gate type transistors disposed at each pixel as conventional switching elements. Elements indicated by solid line are switching elements formed on one glass substrate 2, and compose the active substrate 200, and elements indicated by broken line are formed on other glass substrate 9, and compose the color filter substrate 900. Scanning lines 11 (8) and signal lines 12 (7) are formed on the active substrate 200 simultaneously when forming a TFT (thin film transistor) 10 using, for example, amorphous silicon as semiconductor layer and silicon nitride layer as gate insulating layer.

Liquid crystal cells 13 are composed of transparent conductive pixel electrodes 14 (see FIG. 10) formed on the active substrate 200, transparent conductive counter electrodes 15 formed on the color filter substrate 900, and liquid crystal 16 (see FIG. 10) contained in the closed space formed between the two substrates 200 and 900, and electrically they are equivalent to capacitors. The constitution of storage capacity for increasing the time constant of the liquid crystal cells 13 may be realized by several methods. In FIG. 9, for example, a storage capacity 17 is composed by inserting an insulating layer such as gate insulating layer of TFT 10 between common electrodes 18 common to all pixel electrodes 14 and the pixel electrodes 14.

FIG. 10 is a sectional view showing essential parts of an active type color liquid crystal panel. Coloring layers 19 composed of stained photosensitive gelatin or coloring photosensitive resin are disposed in a specified arrangement in three primaries of R, G, B, corresponding to the pixel electrodes 14, at the closed space side of the color filter substrate 900. Counter electrodes 15 common to all pixel electrodes 14 are formed on the coloring layers 19 in order to avoid loss of voltage distribution in the liquid crystal cells due to interposition of the coloring layers 19. Orientation films (for example, polyimide resin thin film layers in a film thickness of about 0.1 µm) 20 applied on the two substrates 200, 900, contacting with the liquid crystal 16 are intended to align the liquid crystal molecules in a specified direction. Thus, when the twisted nematic (TN) type is used as the liquid crystal 16, upper and lower polarizers 21 are needed.

When opaque films 22 of low reflectivity are arranged in the boundaries of R, G, B coloring layers 19, reflected light from the wiring layers such as signal lines 12 on the active substrate 200 can be prevented, and therefore the contrast ratio of the image is enhanced. It is also possible to prevent increase of leak current during OFF operation due to external light irradiation of the TFT 10 which is a switching element, 80 that the liquid crystal panel can be operated even under an intense external light. This is already realized as black matrix (BM).

Various examples may be also considered for the composition of the black matrix (BM). From the viewpoint of cost, it is not advantageous in consideration of occurrence of step in the boundaries of adjacent coloring layers 19 and transmissivity of light, therefore, it is easy and rational to use metal thin films in a film thickness of about 0.1 µm, for example, Cr thin films, as the opaque films 22.

In FIG. 10, meanwhile, in addition to the TFT 10, scanning lines 11 and storage capacity 17, other constituent elements such as back light source and spacer are omitted. Reference numeral 23 is a conductive thin film for connecting between the pixel electrodes 14 and the drain of the TFT 10. This conductive thin film 23 is generally formed simultaneously by the same material as the signal lines 12, and is called a drain wiring (electrode). Although not shown in the drawing, the counter electrode 15 is connected to a proper conductive pattern on the active substrate 200 having the TFT 10, through an appropriate conductive paste on the outer circumference slightly outside of the image display unit, and is incorporated in part of the electrode terminal groups 5, 6 (see FIG. 8) so as to be connected electrically.

The liquid crystal cells in this liquid crystal panel are composed of transparent conductive pixel electrodes formed on one substrate 200, similar counter electrodes on the color filter substrate 900, and liquid crystal contained in the clearance between the two substrates. In a recently developed IPS (in-plane switching) type liquid crystal panel capable of expanding the viewing field angle, liquid crystal cells are composed of a pair of comb electrodes formed on one glass substrate and liquid crystal contained in the clearance between two substrates, and therefore transparent electrodes are not required also on the color filter substrate 900, but the detail is omitted herein.

In the existing active type liquid crystal panel as mentioned herein, several to millions of unit pixels composed of switching elements and pixel electrodes are arranged, and it is obtained by the precision assembling technology of a transparent insulating substrate or active substrate such as glass substrate having electrode lines such as scanning lines and signal lines for connecting between unit pixels and electrode terminal groups formed at ends of the electrode lines and corresponding to the mounting, and other glass substrate or glass filter substrate.

Therefore, it requires nearly same materials, production facilities, environments and techniques as needed in fabrication of semiconductor integrated circuits, and actually it is realized by the manufacturing technologies applicable to micron-order pattern forming, formation of various thin films, liquid crystal cell thickness, etc.

The active type liquid crystal panel is also a device that is hard to improve the yield. Since images are displayed, evidently, not a single line defect is permitted, but it is extremely difficult to manufacture an intact product completely free from point defect, stain or speck. At the present technical level of manufacture, it is realistic to comprise at a certain extent, for example, as for point defects, a particular standard such as light point defects of 3 or less in the central area of the screen and total number of black point defects of 20 or less is specified in consideration of the panel size, resolution, etc.

Raster (white point) defects are always lit defects, and they are very obvious and hence the standard is particularly strict. Accordingly, when an active substrate is completely manufactured, electric characteristics of unit pixels are inspected, and if light point defects are discovered, a rescue technology for correcting them at this stage by the laser to convert into black point defects has been already established.

FIG. 11 shows a rescue example executed if the TFT 10 fails to operate due to some cause. This is a method of fusing the protrusion 12' of the signal line 12 insulated through a proper insulating layer and the pixel electrode 14 by using the laser and connecting them electrically as 24. Accordingly, the pixel electrode 14 is always at the same potential as the signal line 12 regardless of the control of the scanning line 12, and therefore if the display mode of the liquid crystal panel is normally white, it is known that it is not at least light point defect.

However, light point defects can occur not only when manufacturing the active substrate 200, but also when assembling the panel, and there is a limit to enhancement of yield by the correction at the time of manufacture of the active substrate 200 only. For example, pin holes of the orientation film, defective orientation and the like cannot be converted to black point defects by electric treatment. Besides, in the correction by emitting laser to the assembled liquid crystal panel, bubbles may be formed, or holes may be opened in the black matrix, and the successful rate is not always high at the present.

SUMMARY OF THE INVENTION

The invention is devised to solve the problems in the prior art, and it is hence an object thereof to present a liquid crystal panel and its manufacturing method capable of enhancing the yield greatly by converting light point defects into black point defects, in the stage of active type substrate or simple matrix type substrate, or in the stage of liquid crystal panel by assembling them.

A liquid crystal panel of the invention comprises an active substrate forming a plurality of scanning lines, at least one layer of insulating layer, and a plurality of signal lines nearly orthogonal to the scanning lines, sequentially on a principal plane of a first transparent insulating substrate, and having at least one switching element and pixel electrode at every intersection of the scanning lines and signal lines, a second transparent insulating substrate or color filter substrate disposed oppositely to the active substrate, and liquid crystal contained in the spacing between the active substrate and the second transparent insulating substrate or color filter substrate, in which an opaque film is formed at a position corresponding to a specific unit pixel on other principal plane of the first transparent insulating substrate or a non-opposite side of the second transparent insulating substrate or color filter substrate. According to this first constitution of the liquid crystal panel, since the opaque film is formed at an arbitrary position on the first and second transparent insulating substrates for composing the liquid crystal panel, the opaque film can be formed on the transparent insulating substrate at the position corresponding to the unit pixel of the light point defect, so that the light point defect can be converted into a black point defect, thereby realizing an active type liquid crystal panel free from light point defect.

A manufacturing method of a liquid crystal panel of the invention comprises an active substrate forming a plurality of scanning lines, at least one layer of insulating layer, and a plurality of signal lines nearly orthogonal to the scanning lines, sequentially on a principal plane of a first transparent insulating substrate, and having at least one switching element and pixel electrode at every intersection of the scanning lines and signal lines, a second transparent insulating substrate or color filter substrate disposed oppositely to the active substrate, and liquid crystal contained in the spacing between the active substrate and the second transparent insulating substrate or color filter substrate, comprising a step of detecting light point defects in image inspection after panel assembling step or mounting step, a step of forming an opaque film at a position corresponding to the light point defect on other principal plane of the transparent insulating substrate or a non-opposite side of the second transparent insulating substrate or color filter substrate, and a step of adhering a polarizer to either one or both of the other principal plane of the transparent insulating substrate and non-opposite side of the color filter substrate. According to this manufacturing method of liquid crystal panel, light point defects are detected in image inspection after panel assembling step or mounting step, the opaque film is formed at the position of the light point defect on the first and second transparent insulating substrates for composing the liquid crystal panel, and then the polarizer is adhered to either one or both of the first and second transparent insulating substrates for composing the liquid crystal panel, so that the light point defect can be converted into a black point defect, thereby realizing an active type liquid crystal panel free from light point defect.

In this first manufacturing method of liquid crystal panel of the invention, the opaque film is preferably formed of metal thin film by laser CVD. According to this preferred example, the opaque film of high precision can be formed, and the film thickness of the opaque film can be easily controlled under 0.3 $\mu$m, so that it would not disturb adhesion of the polarizer. In addition, since such opaque film is formed of a thin metallic film, when cleaning the panel just before adhering the polarizer, a chemical cleaning method using a chemical solution or a physical cleaning method using ultrasonic waves may be used same as in the prior art, and adhesion failures of polarizer will not be increased.

Also in the manufacturing method of liquid crystal panel of the invention, an opaque film can be also formed by using micro-jet of organic resin containing either one or both of black pigment and dye. According to this preferred example, the opaque film can be formed easily, which contributes greatly to reduction of light point defects. Besides, since the thickness of the opaque film can be controlled to 1 to 2 $\mu$m, it will not disturb adhesion of polarizer.

DETAILED DESCRIPTION OF THE INVENTION

The invention is more specifically described below while referring to embodiments.

(First embodiment)

Figure 1:
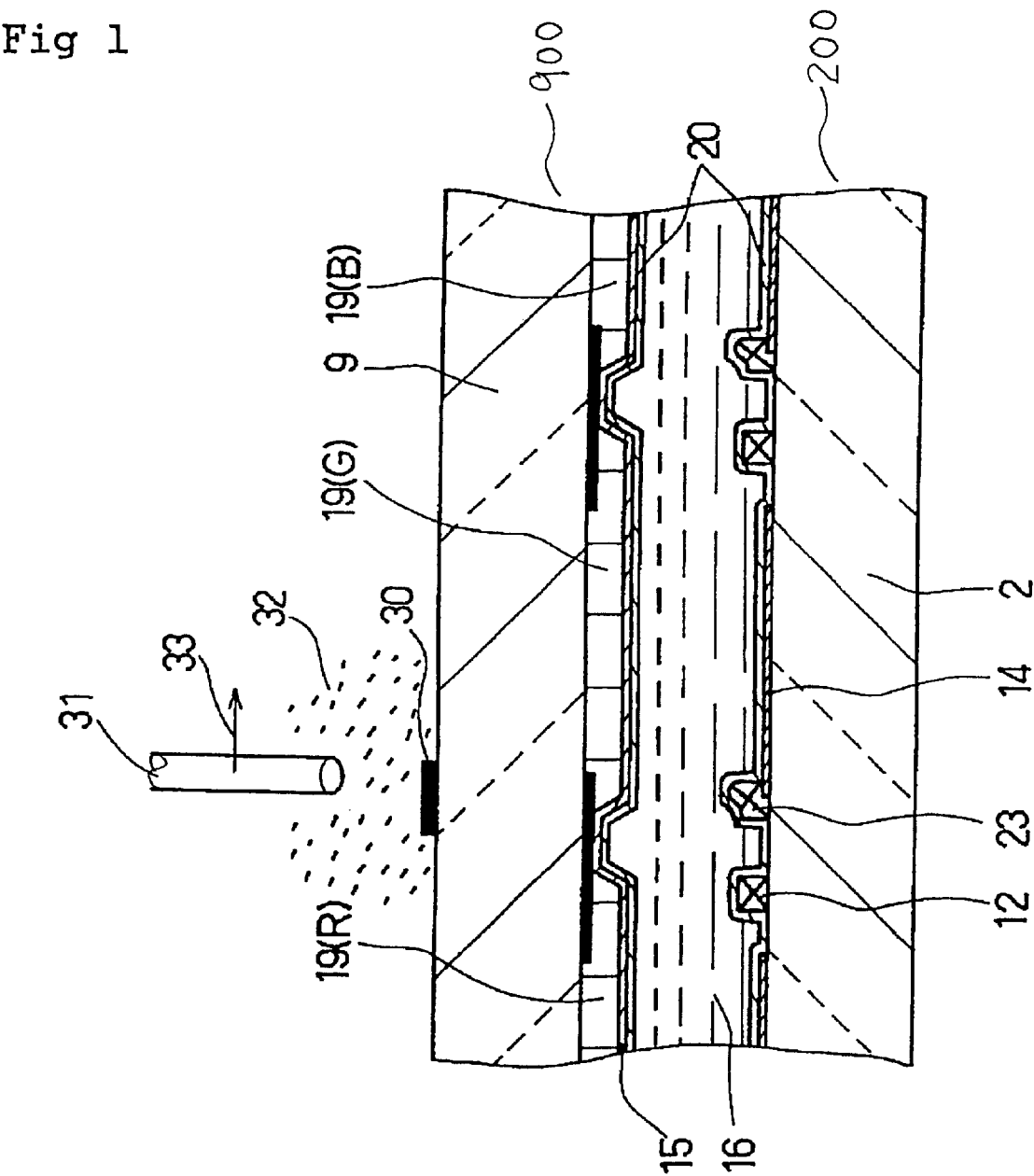
FIG. 1 is a process sectional view showing a method of forming an opaque film on a liquid crystal panel in a first embodiment of the invention.

FIG. 1 is a process sectional view showing a method of forming an opaque film on a liquid crystal panel by laser CVD in a first embodiment of the invention.

As shown in FIG. 1, on a principal plane of a first transparent insulating substrate 2, a plurality of scanning lines and plural signal lines 12 arranged almost orthogonally to the scanning lines through at least one layer of insulating layer are provided. Also on the principal plane of the first transparent insulating substrate 2, at least one switching element and pixel electrodes 14 are provided at each intersection of the scanning lines and signal lines 12. As a result, an active substrate 200 is composed. In FIG. 1, reference numeral 23 is a conductive thin film for connecting the pixel electrode 14 and the drain of a TFT.

On a principal plane of a second transparent insulating substrate 9, coloring layers 19 (R), 19 (G), 19 (B) of three primaries R, G, B are disposed according to a specified sequence corresponding to the pixel electrodes 14. On the coloring layers 19, there are counter electrodes 15 common to all pixel electrodes 14 for avoiding voltage distribution loss in the liquid crystal cell due to interposition of the coloring layers 19. As a result, a color filter substrate 900 is composed.

The active substrate 200 and color filter substrate 900 are disposed parallel in a confronting state of pixel electrodes 14 and counter electrodes 15, and an orientation film 20 made of polyimide resin thin film layer is provided on each confronting surface. The space between orientation films 20 are filled with liquid crystal 16.

The liquid crystal material used herein was nematic liquid crystal generally employed in TN mode.

Thus, a liquid crystal panel is composed. The manufacturing process of liquid crystal panel roughly consists of three steps: active substrate forming step, liquid crystal panel assembling step, and mounting step. In the final stage of the liquid crystal panel assembling step, meanwhile, an image can be displayed by applying an electric signal to the terminal electrodes.

In the final stage of the mounting step, an image can be also displayed by applying about 20 kinds of electric signals, such as power source, clock signal and video signal, to the LSI for driving.

Since it is rare that a new point defect occurs after the liquid crystal panel assembling step, it is realistic to detect light point defects in image inspection after the liquid crystal panel assembling step. Light point defects can be easily detected by applying electric signals to all terminals of liquid crystal panel, but a certain technique is needed for identifying the positions. In the conventional inspection line of visual image inspection by inspectors, as disclosed in Japanese Laid-open Patent No. 63-174095, cursor lines from false signals are overlaid and displayed on point defects on a displayed image, and the position of occurrence of point defect (its address) must be recorded by the intersection of the scanning line (the channel number from a certain determined origin, for example, 102nd line) and signal line (similarly, for example, 357th line). Recently, on the other hand, it is possible to take in an inspected image by using a CCD camera of high definition, and identify the position of point defect by electric image processing. That is, by the CCD camera having a sufficient resolution for recognizing point defects on the displayed image and the image processing technology, it is possible to measure coordinates of a point defect automatically, and the position of point defect can be easily identified without error in data transfer or the like.

In this image inspection, it is not necessary to adhere a polarizer to the liquid crystal panel, and it is only required to dispose a polarizer between it and the back light source, or between the liquid crystal panel and the inspector or the digital camera for taking in the image.

After detecting the coordinates of the light point defect, as shown in FIG. 1, an opaque film 30 is formed on the upper side of the color filter substrate 900 or lower side of the active substrate 200, corresponding to the unit pixel, by the laser CVD technology.

The laser CVD technology is a technique for precipitating a metal thin film by irradiating metal carbonyl with laser light, and it is lately used as a technique for repairing broken electrode wires of the active substrate 200 for composing a TFT liquid crystal panel.

Herein, the irradiation condition of laser CVD is briefly described below. As the laser medium, YAG containing Nd is used.

In the second harmonic specification, Q switch laser having oscillation wavelength of 0.532 $\mu$m and continuous output of about 1 W is used as high energy light 31, and while moving the high energy light 31 in the direction of arrow 33 in a tungsten-carbonyl gas [W(CO6)] atmosphere 32 at the repeating frequency of 10 kHz, pulse width of 70 nsec, beam width of 4 $\mu$m, and beam scanning speed of 1 to 2 $\mu$m/sec, when a stripe pattern of 4 $\mu$m in width, 50$\mu$m in length and 0.3 $\mu$m in thickness is formed on the upper side of the color filter substrate 900, the resistance value of this pattern is 17$\Omega$ (see NEC Technical Bulletin Vol. 42, No. 8/1989). In the invention, the electric characteristics of the formed opaque film 30 do not matter, and hence it is important to enhance the productivity of correction of light point defects by raising the forming speed of the opaque film pattern.

More specifically, the film thickness of the opaque film 30 is sufficient at about 0.1 $\mu$m nearly same as in black matrix. The size of the unit pixel varies with the panel size and definition, and, for example, in the case of a diagonal 25 cm VGA (video graphic array) panel, it is 0.11 mm×0.33 mm, and therefore it takes a considerable time for forming the opaque film 30 in the above condition.

Figure 2:
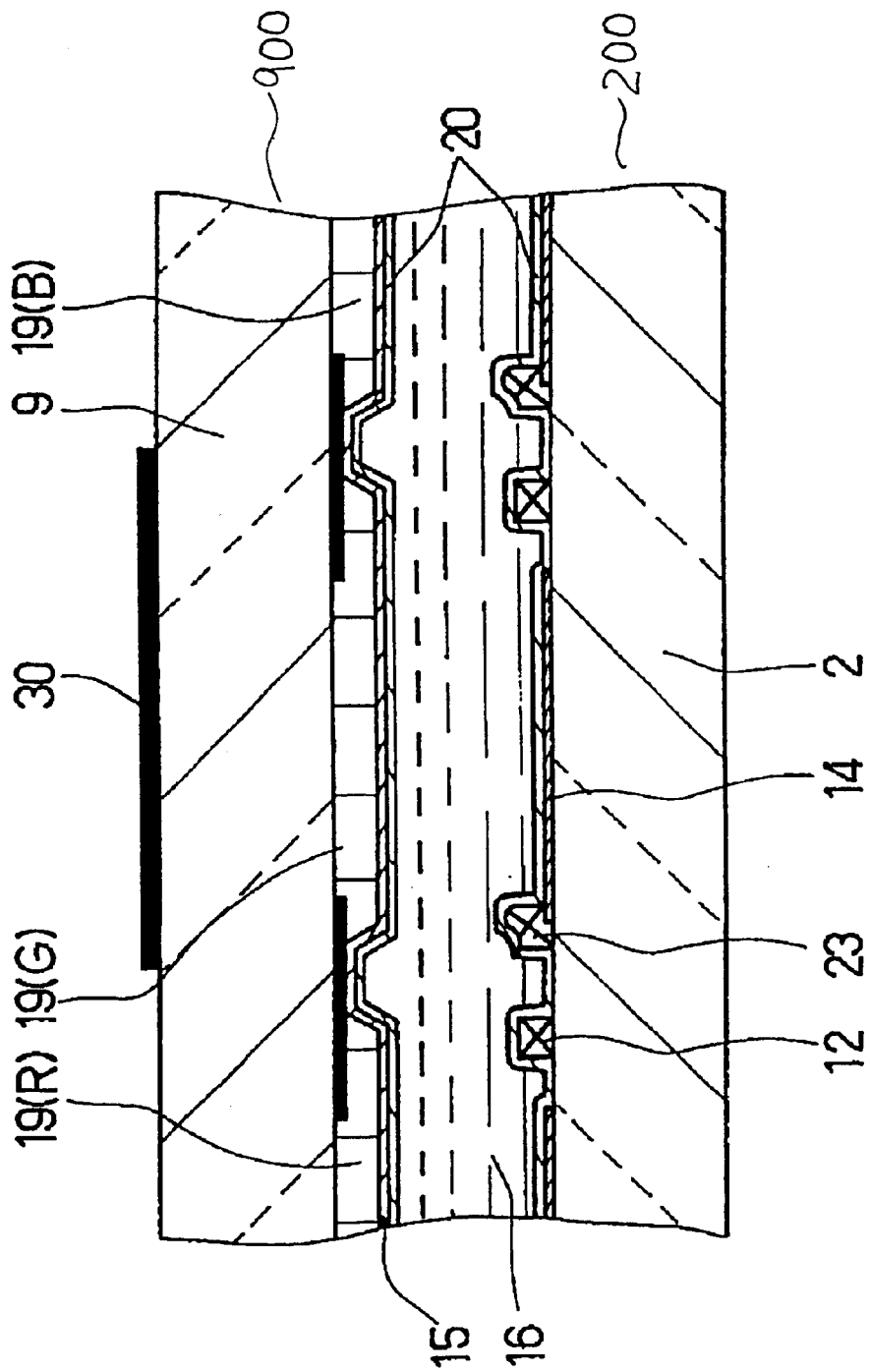
FIG. 2 is a sectional view showing the liquid crystal panel in the first embodiment of the invention.

FIG. 2 shows a final state of forming the opaque film 30 in a size nearly same as the unit pixel on the upper side of the color filter substrate 900 in which the unit pixel of light point defect is positioned, by the above laser CVD technology. After forming the opaque film 30, depending on the properties of the liquid crystal material, by adhering a polarizer to either one or both of the upper side of the color filter substrate 900 and lower side of the active substrate 200, a liquid crystal panel can be completed as an optical element.

According to the embodiment, since the opaque film 30 is formed at an arbitrary position on the lower side of the active substrate 200 or upper side of the color filter substrate 900 for composing the liquid crystal panel, the light point defect can be converted into a black point defect by forming the opaque film 30 on the transparent insulating substrate at the position corresponding to the unit pixel of the light point defect, so that an active type liquid crystal panel free from light point defect may be realized.

(Second embodiment)

Figure 3:
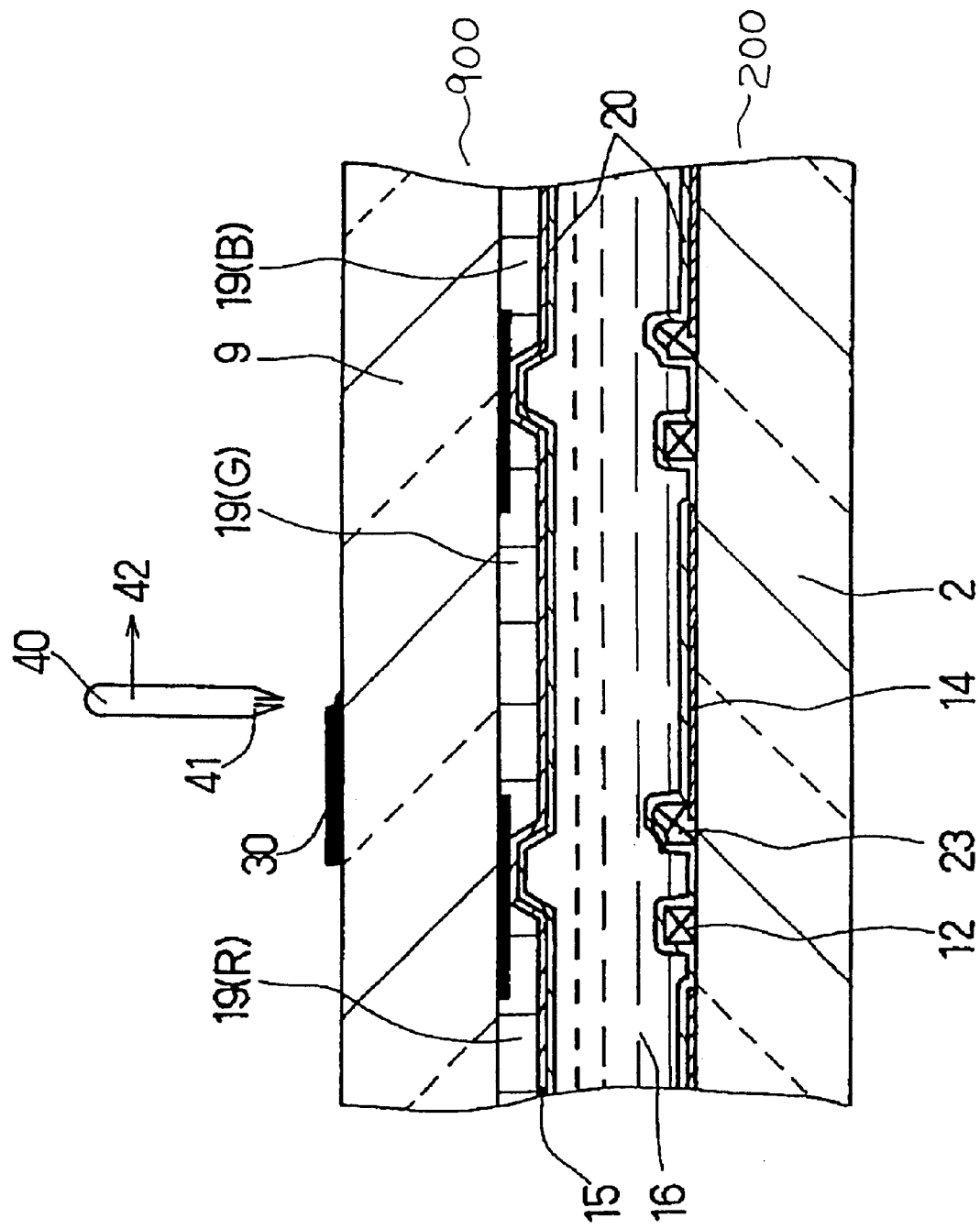
FIG. 3 is a process sectional view showing a method of forming an opaque film on a liquid crystal panel in a second embodiment of the invention.

FIG. 3 is a process sectional view showing a method of forming an opaque film on a liquid crystal panel in a second embodiment of the invention.

As shown in FIG. 3, according to this embodiment, by selective coating using micro-jet of organic resin containing either one or both of black pigment and dye, an opaque film 30 is formed on the upper side of the color filter substrate 900 or lower side of the active substrate 200 corresponding to the unit pixel.

More specifically, while moving a high pressure nozzle 40 having a discharge hole 41 of about several microns in diameter at its tip in the direction of arrow 42, an organic resin liquid containing either one or both of black pigment and dye is sprayed to the upper side of the color filter substrate 900 from the discharge hole 41 of the high pressure nozzle 40. As a result, the opaque film 30 corresponding to the size of the unit pixel is depicted. Of course, in order to depict the opaque film 30 in a precise size, an utmost attention should be paid to the viscosity of organic resin liquid and content of solvent. As compared with the laser CVD technology, the micro-jet technology is easier and far lower in the cost of facilities, but it requires heat treatment in order to solidify the organic resin liquid by evaporating the solvent after forming the opaque film 30. Besides, if the opaque film 30 is formed in a thickness of 0.5 $\mu$m or less, the opacity is lowered, but there is no problem for adhering the polarizer having a thickness of 0.1 mm or more.

Figure 4:
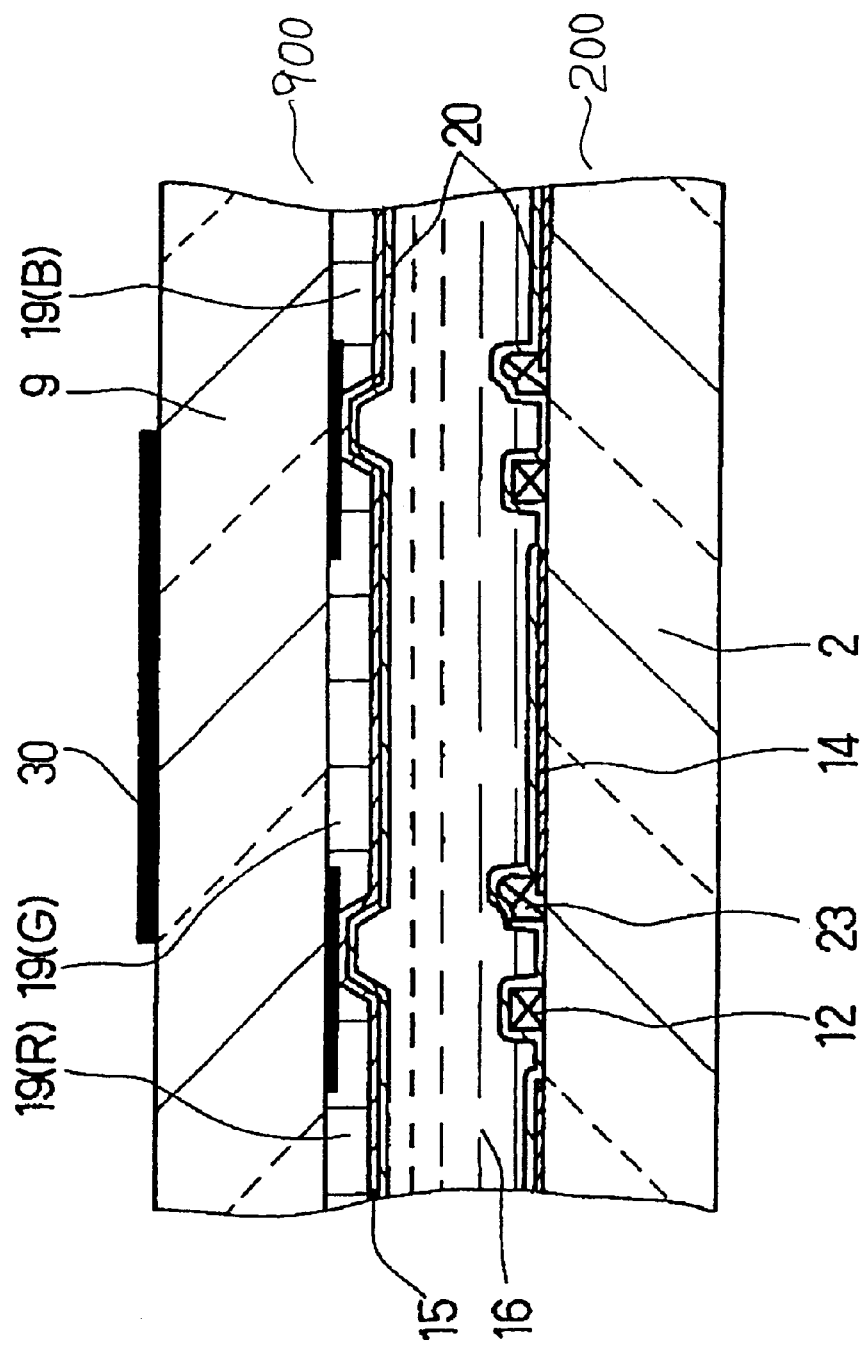
FIG. 4 is a sectional view showing the liquid crystal panel in the second embodiment of the invention.

FIG. 4 shows a final state of forming the opaque film 30 in a size nearly same as the unit pixel on the upper side of the color filter substrate 900 on the unit pixel in which a light point defect is positioned, by the above micro-jet technology. After forming the opaque film 30, depending on the properties of the liquid crystal material, by adhering a polarizer to either one or both of the upper side of the color filter substrate 900 and lower side of the active substrate 200, a liquid crystal panel can be completed as an optical element.

The correction method of light point defect of the invention is effective not only in the above active type liquid crystal panel, but also in other liquid crystal panels as well. Other liquid crystal panels include, for example, active type reflection liquid crystal panel and simple matrix type reflection liquid crystal panel, which differ only in the internal structure and are same in the technical points about correction of light point defect, and only matters of particular attention are mentioned below.

Figure 5:
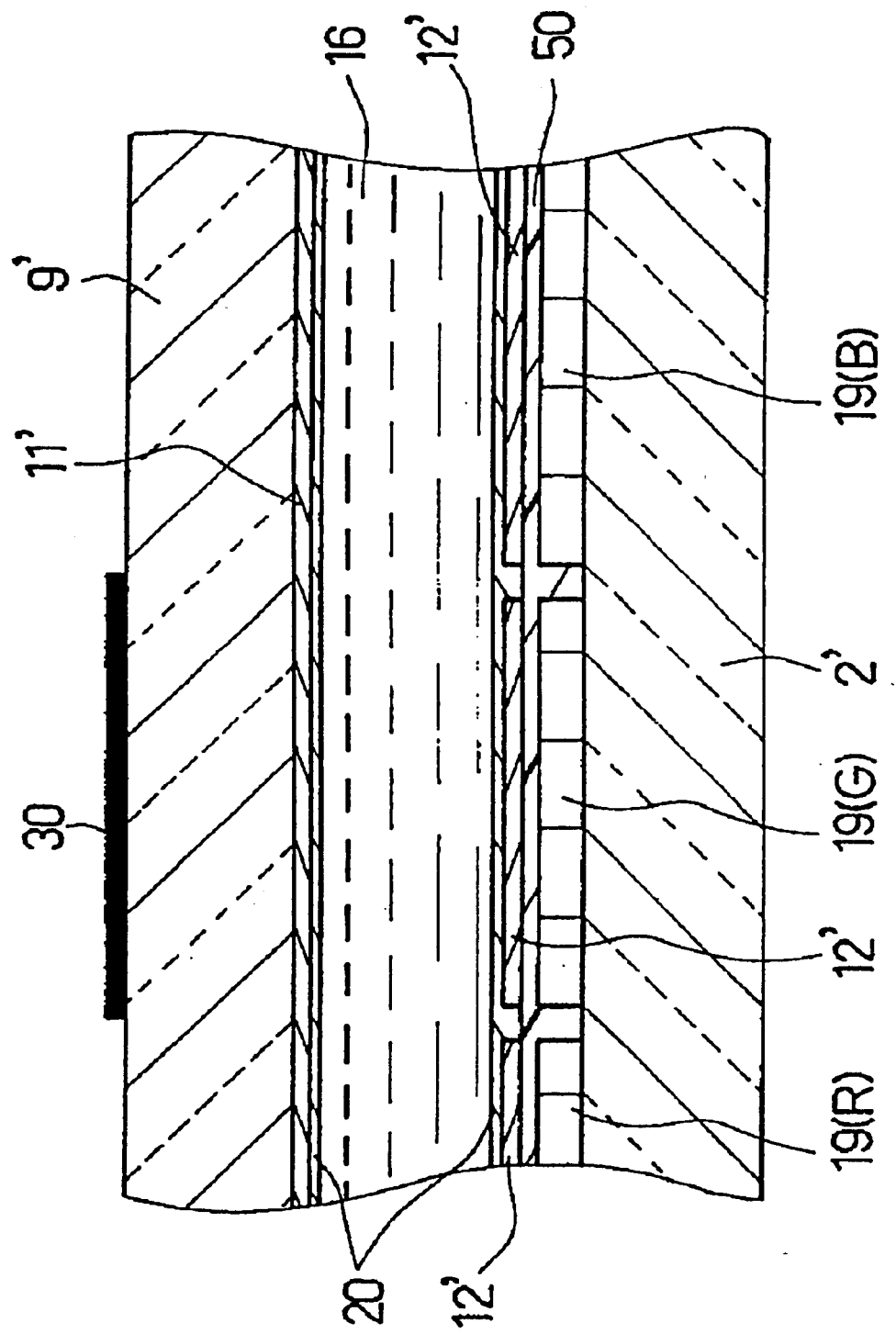
FIG. 5 is a sectional view showing a simple matrix type liquid crystal panel in an embodiment of the invention.

FIG. 5 shows a final state of forming a metal thin film, or an opaque film made of an organic resin containing either one or both of black pigment and dye, on one transparent insulating substrate corresponding to the light point defect on a simple matrix type liquid crystal panel. As shown in FIG. 5, a plurality of transparent conductive scanning lines 11' are formed on a principal plane of a first transparent insulating substrate (glass substrate) 9'. On the other hand, on a principal plane of a second transparent insulating substrate (glass substrate) 2' disposed oppositely to the first transparent insulating substrate 9', striped coloring layers 19 and a plurality of transparent conductive signal lines 12' are sequentially formed. Orientation films 20 are formed on the opposite sides of the first transparent insulating substrate 9' and second transparent insulating substrate 2', and the space between the orientation films 20 is filled with liquid crystal 16. Further, on the upper side of the first transparent insulating substrate 9' corresponding to the light point defect of this simple matrix type liquid crystal panel, a metal thin film, or an opaque film 30 made of an organic resin containing either one or both of black pigment and dye is formed. In FIG. 5, reference numeral 50 is a transparent flat insulating layer for absorbing the steps of the coloring layers 19, which is made of a transparent acrylic resin or the like.

Since this simple matrix type liquid crystal panel is lit and displayed by the light from a back light source, same as in the first embodiment, the object is achieved as far as the opaque film is formed on either the upper side of the first transparent insulating substrate 9' or the lower side of the second transparent insulating substrate 2'.

Figure 6:
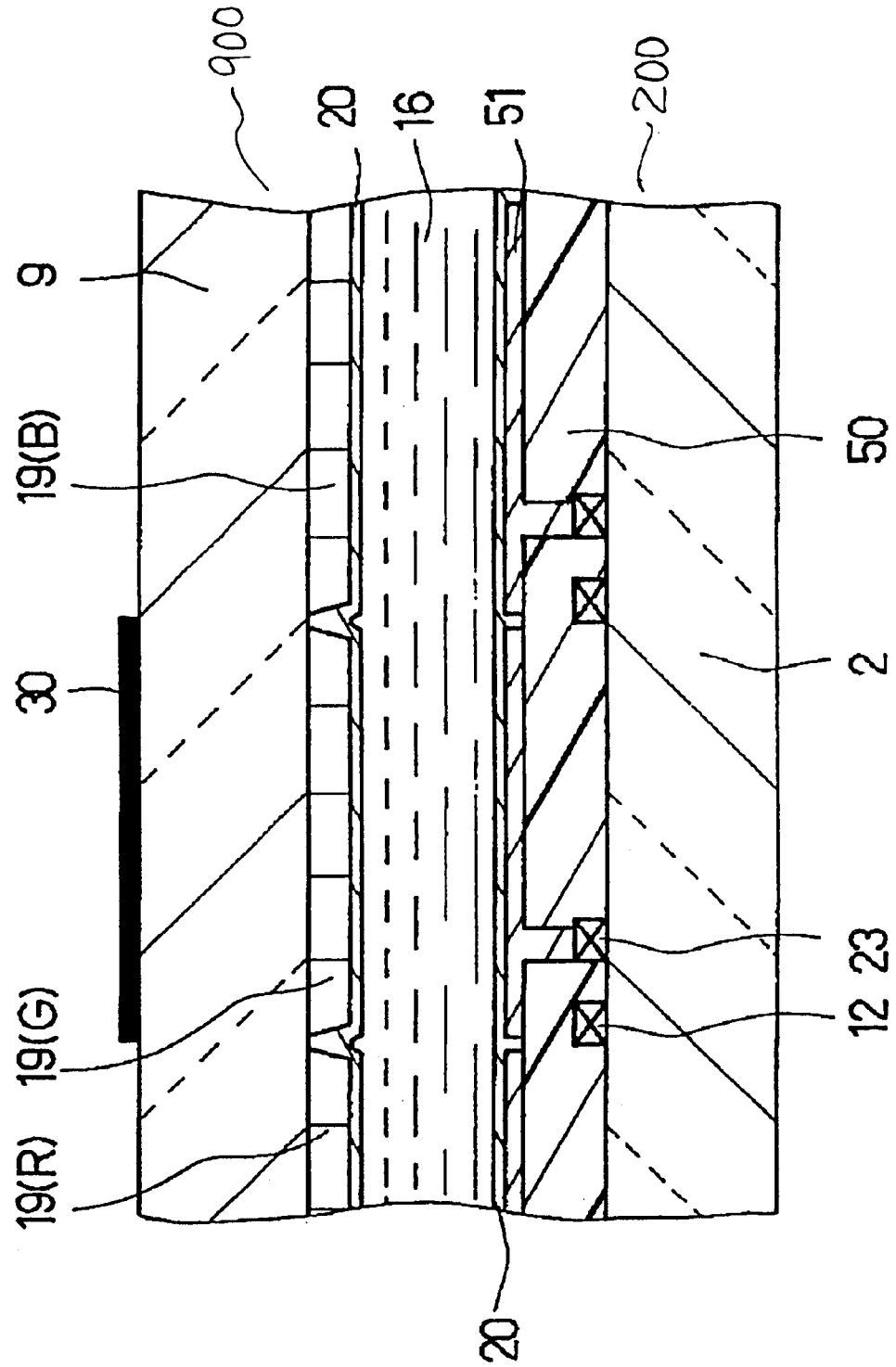
FIG. 6 is a sectional view showing an active type reflection liquid crystal panel in an embodiment of the invention.

FIG. 6 shows a final state of forming a metal thin film, or an opaque film made of an organic resin containing either one or both of black pigment and dye, on one transparent insulating substrate corresponding to the light point defect on an active type reflection liquid crystal panel. As shown in FIG. 6, a plurality of scanning lines, at least one layer of insulating layer, and a plurality of signal lines 12 nearly orthogonal to the scanning lines are formed sequentially on a principal plane of an active substrate 200, and at least one switching elements and reflection electrodes 51 are provided at each intersection of the scanning lines and signal lines 12. On the other hand, on a principal plane of a color filter substrate 900 disposed oppositely to the active substrate 200, striped coloring layers 19 are formed. Orientation films 20 are formed on the opposite sides of the active substrate 200 and color filter substrate 900, and the space between the polyimide resin thin film layers 20 is filled with liquid crystal 16. Further, on the upper side of the color filter substrate 900 corresponding to the light point defect of this active type reflection liquid crystal panel, a metal thin film, or an opaque film 30 made of an organic resin containing either one or both of black pigment and dye is formed.

In this active type reflection liquid crystal panel, since the image is displayed by reflecting the light from outside (above), different from the first and second embodiments, the object is not achieved unless the opaque film 30 is formed only on the upper side of the transparent insulating substrate 9. Likewise, being of reflection type, the active substrate 200 is an insulating substrate and is not required to be transparent.

The device shown in FIG. 6 is further described below. The reflection electrode 51 requires a certain thickness as shown in order to enhance the opening rate, and, for example, the active substrate 200 is covered with an organic resin 50 of 2 to 3 microns in thickness and is flattened to form the reflection electrode 51. In this case, by deviating the position of the reflection electrode 51 and thin film transistor, unlike the transmission type, the reflection electrode 51 comes to have a function of shielding light of the thin film transistor. In the case the surface of the reflection electrode 51 is a mirror smooth surface, by inserting a diffusion plate between the polarizer and color filter substrate, or by forming the surface of the reflection electrode 51 in a diffusion surface (rough or satin), the viewing field angle may be expanded, so that the freedom of design is wider.

Figure 7:
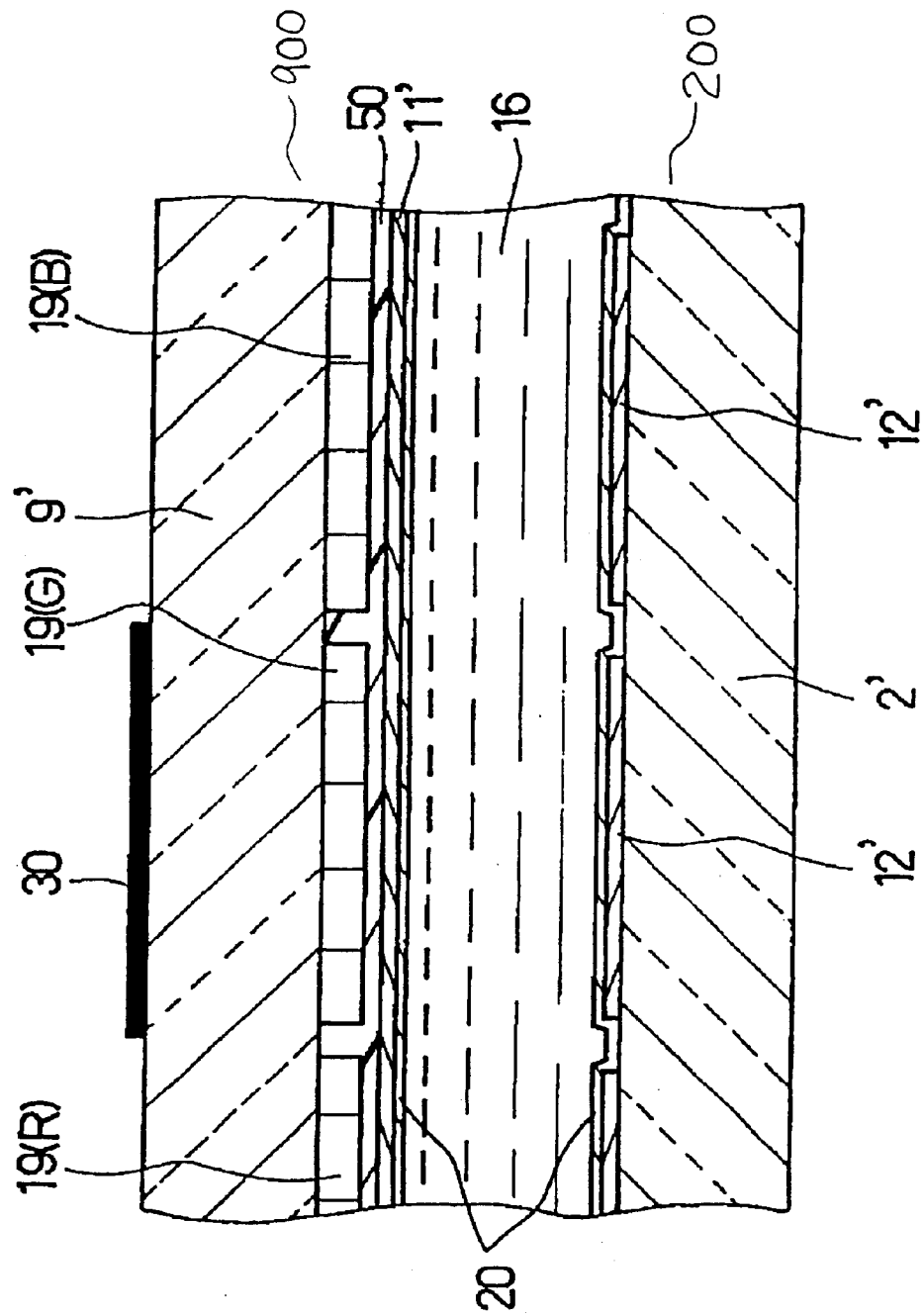
FIG. 7 is a sectional view showing a simple matrix type reflection liquid crystal panel in an embodiment of the invention.
Figure 8:
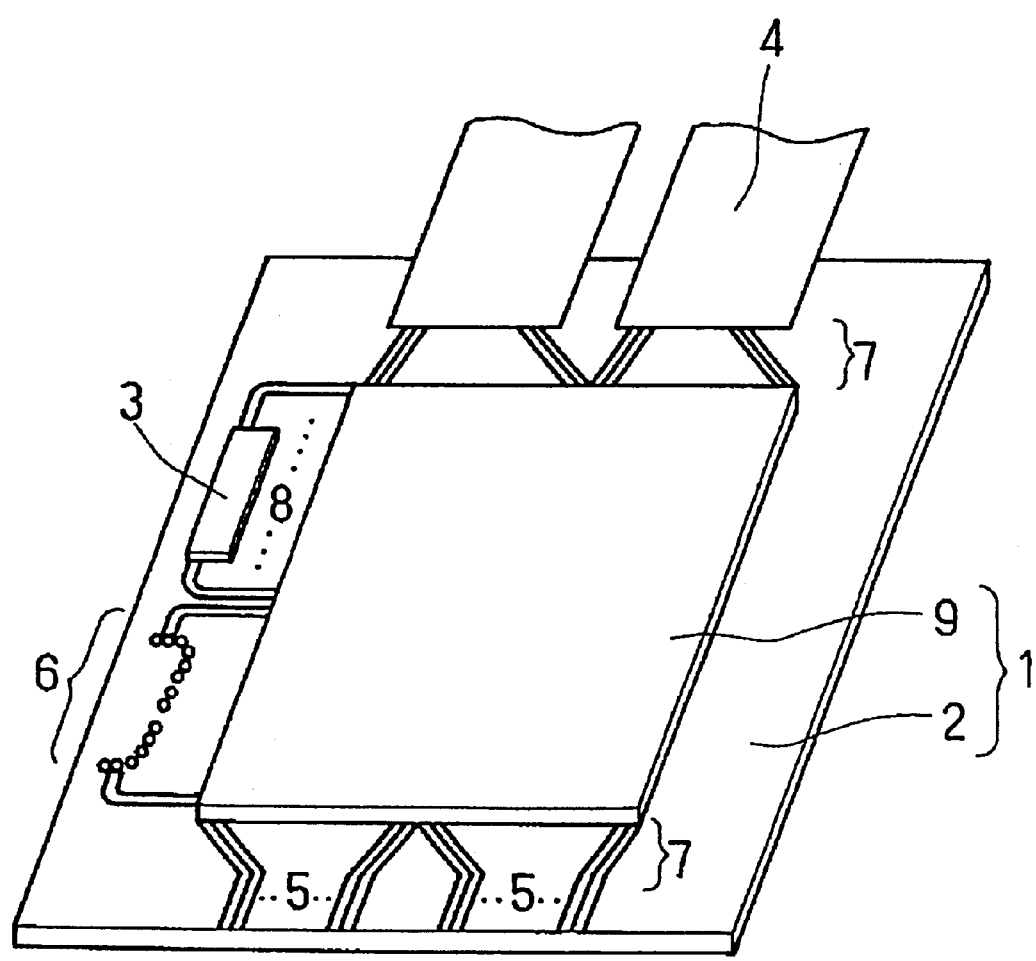
FIG. 8 is a perspective view showing a mounting state of a conventional liquid crystal panel.
Figure 9:
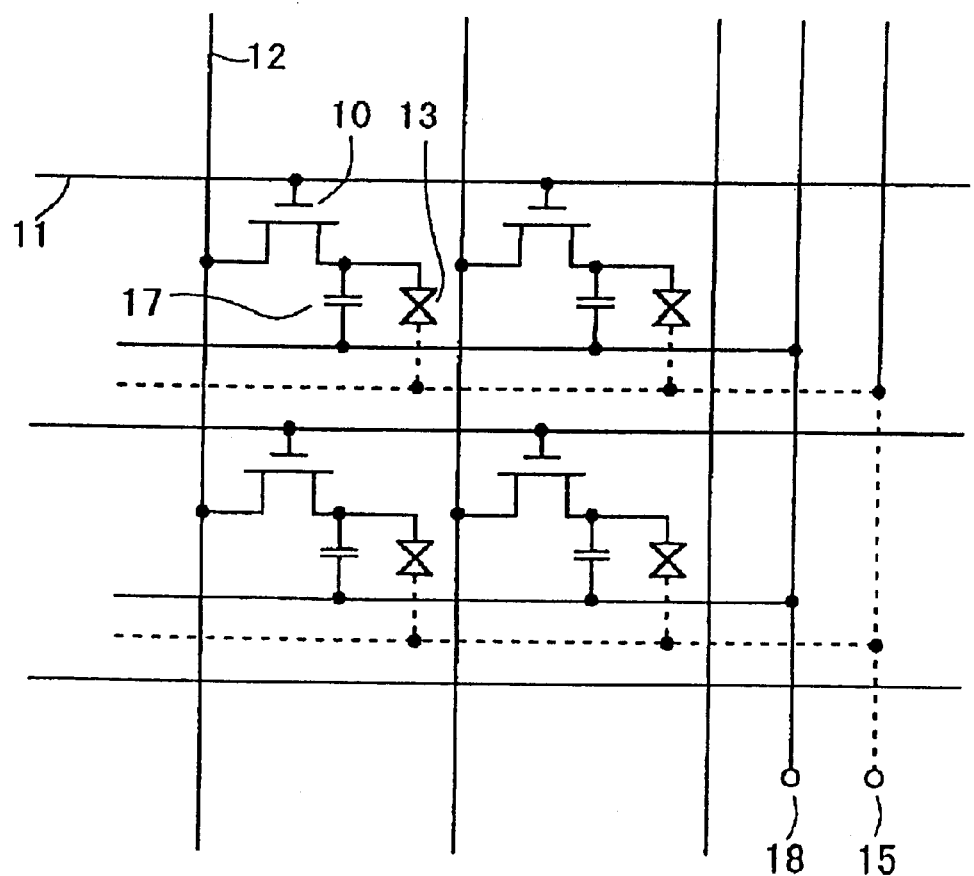
FIG. 9 is an equivalent circuit diagram of a conventional active type liquid crystal panel.
Figure 10:
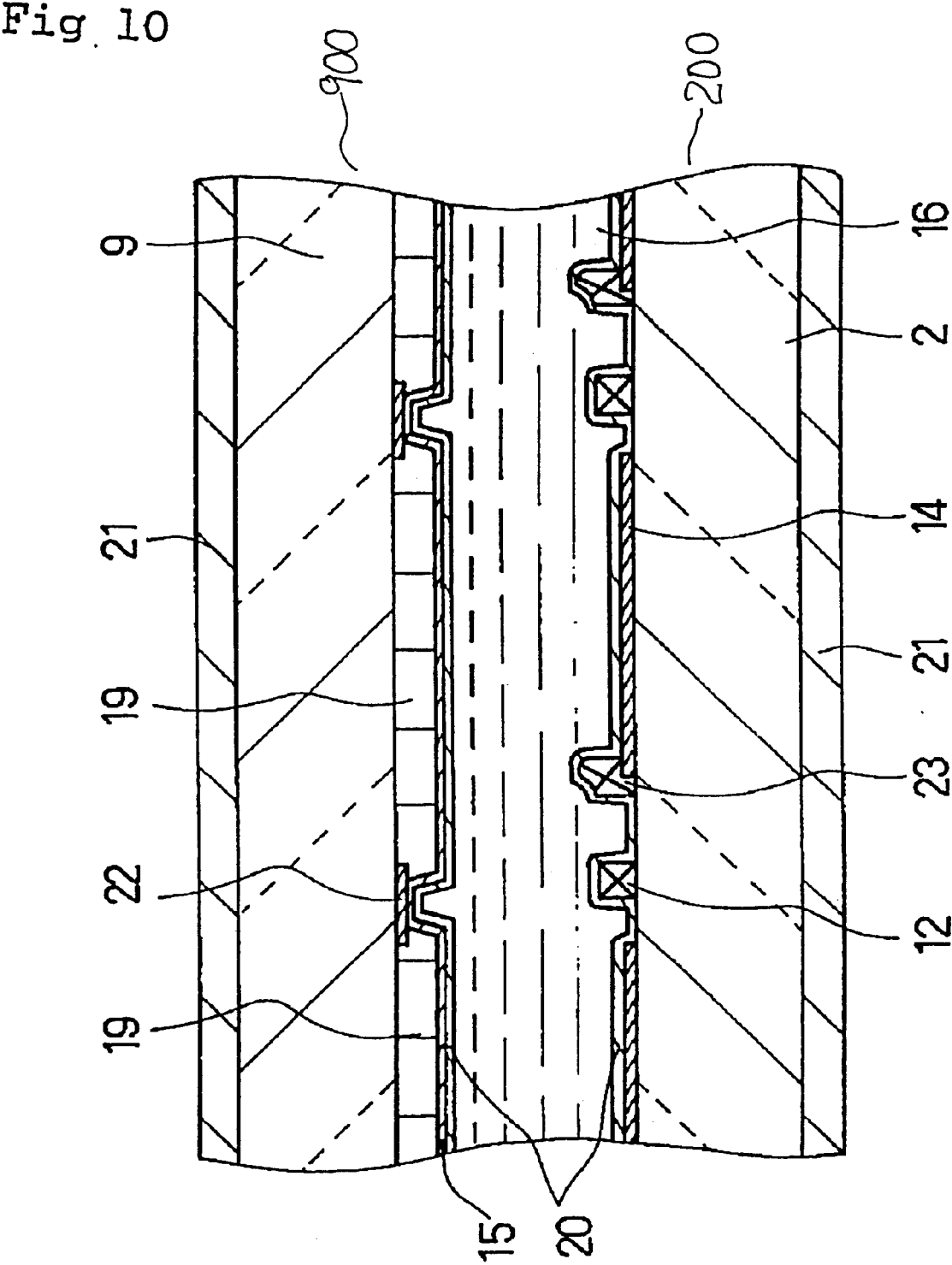
FIG. 10 is a sectional view showing an active type liquid crystal panel in a prior art.
Figure 11:
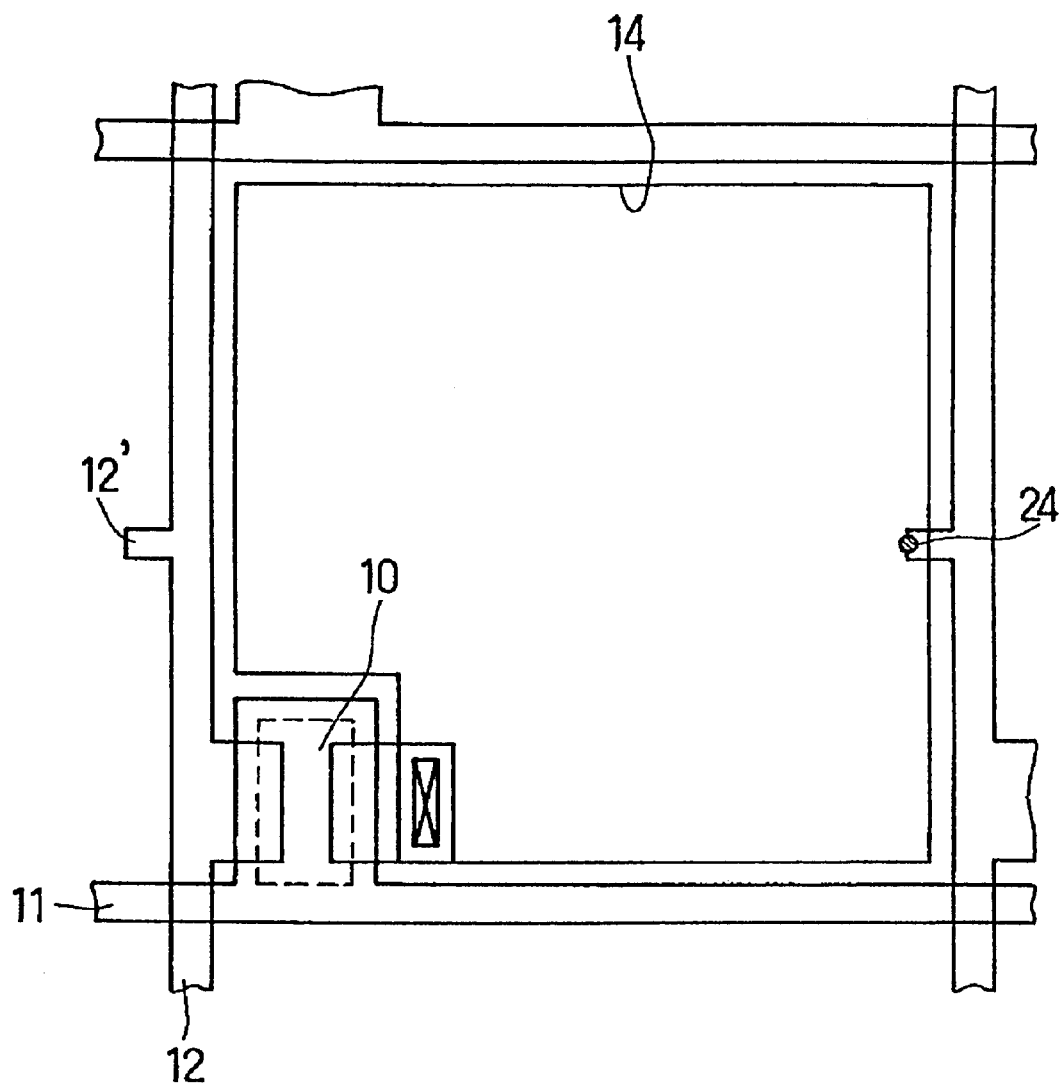
FIG. 11 is a pattern layout diagram in a unit pixel for correction of light point defect in a prior art.

FIG. 7 shows a final state of forming a metal thin film, or an opaque film made of an organic resin containing either one or both of black pigment and dye, on a transparent insulating substrate corresponding to the light point defect on a simple matrix type reflection liquid crystal panel. As shown in FIG. 7, a striped coloring layers 19 and at least a plurality of transparent conductive scanning lines 11' formed on the coloring layers 19 are provided on a principal plane of a transparent insulating substrate 9'. On the other hand, on a principal plane of an insulating substrate 2' disposed oppositely to the transparent insulating substrate 9', a plurality of metallic signal lines 12' are formed. Orientation films 20 made of polyimide resin thin film layers are formed on the opposite sides of the transparent insulating substrate 9' and insulating substrate 2', and the space between the orientation films 20 is filled with liquid crystal 16. Further, on the upper side of the transparent insulating substrate 9' corresponding to the light point defect of this simple matrix type reflection liquid crystal panel, a metal thin film, or an opaque film 30 made of an organic resin containing either one or both of black pigment and dye is formed.

In this simple matrix type reflection liquid crystal panel, since the image is displayed by reflecting the light from outside, different from the first and second embodiments, the object is not achieved unless the opaque film 30 is formed only on the upper side of the transparent insulating substrate 9'. Likewise, being of reflection type, the substrate 2' for forming the signal lines 12' as reflection electrodes is an insulating substrate and is not required to be transparent.

As described herein, according to the invention, light point defects are detected, an opaque film is formed on the optical path of the liquid crystal panel having a light point defect to convert the light point defect into a black point defect so as to be free from problem practically, and therefore the quality standard is reduced and the yield is improved. This can be applied similarly in the active type liquid crystal panel, simple matrix type liquid crystal panel not incorporating active element, active type reflection liquid crystal panel, simple matrix type reflection liquid crystal panel not incorporating active element, and others.

In the invention, as mentioned above, since light point defects detected at both stages of completion of substrate and assembling of panel can be converted into black point defects, it is possible to present active type liquid crystal panel, simple matrix type liquid crystal panel, active type reflection liquid crystal panel and simple matrix type reflection liquid crystal panel completely free from light point defect, and therefore the yield is enhanced greatly and it produces significant industrial values.

What is claimed is:

1. A liquid crystal panel comprising an active substrate forming a plurality of scanning lines, at least one layer of insulating layer, and a plurality of signal lines nearly orthogonal to said scanning lines, sequentially on a principal plane of a first transparent insulating substrate and having at least one switching element and pixel electrode at every intersection of said scanning lines and signal lines, a second transparent insulating substrate or color filter substrate disposed oppositely to said active substrate, and liquid crystal contained in the spacing between said active substrate and said second transparent insulating substrate or color filter substrate, wherein an opaque metal thin film for converting a light point defect into a black point defect and having a thickness of under 0.3 $\mu$m is formed at a position corresponding to a specific unit pixel on a surface selected from the group consisting of: the other principal plane of said first transparent insulating substrate, a non-opposite side of said second transparent insulating substrate, and the color filter substrate.

2. A manufacturing method of a liquid crystal panel comprising an active substrate forming a plurality of scanning lines, at least one layer of insulating layer, and a plurality of signal lines nearly orthogonal to said scanning lines, sequentially on a principal plane of a first transparent insulating substrate, and having at least one switching element and pixel electrode at every intersection of said scanning lines and signal lines, a second transparent insulating substrate or color filter substrate disposed oppositely to said active substrate, and liquid crystal contained in the spacing between said active substrate and said second transparent insulating substrate or color filter substrate, comprising:

detecting light point defects in image inspection after either the panel assembling step, or the mounting step;

forming by laser CVD an opaque film having a thickness of under 0.3 $\mu$m, at a position corresponding to said detected light point defect on a surface selected from the group consisting of: the other principal plane of said transparent insulating substrate, a non-opposite side of said second transparent insulating substrate, and the color filter substrate; and adhering a polarizer to at least one of said other principal plane of said transparent insulating substrate and non-opposite side of said color filter substrate.

3. A manufacturing method of a liquid crystal panel of claim 2, wherein an opaque film of metal thin film is formed by laser CVD.

4. A manufacturing method of a liquid crystal panel of claim 2, wherein an opaque film is formed by using micro-jet of organic resin containing either one or both of black pigment and dye.

5. A liquid crystal panel comprising a first transparent insulating substrate forming a plurality of transparent conductive scanning lines on a principal plane, a second transparent insulating substrate disposed oppositely to said first transparent insulating substrate, sequentially forming at least striped coloring layers and a plurality of transparent conductive signal lines on a principal plane, and liquid crystal contained in the spacing between said first transparent insulating substrate and said second transparent insulating substrate, wherein a metal thin opaque film having a thickness of under 0.3 $\mu$m is formed at a position corresponding to a specific unit pixel on other principal plane of said first transparent insulating substrate or second transparent insulating substrate.

6. A manufacturing method of a liquid crystal panel comprising a first transparent insulating substrate forming a plurality of transparent conductive scanning lines on a principal plane, a second transparent insulating substrate disposed oppositely to said first transparent insulating substrate, sequentially forming at least striped coloring layers and a plurality of transparent conductive signal lines on a principal plane, and liquid crystal contained in the spacing between said first transparent insulating substrate and said second transparent insulating substrate, comprising:

detecting light point defects in image inspection after either the panel assembling step or mounting step;

forming an opaque metal thin film having a thickness of under 0.3 $\mu$m at a position corresponding to said detected light point defect on other principal plane of said first transparent insulating substrate or second transparent insulating substrate; and adhering a polarizer to at least one of said other principal planes of said first transparent insulating substrate and said second transparent insulating substrate.

7. A manufacturing method of a liquid crystal panel of claim 6, wherein an opaque film of metal thin film is formed by laser CVD.

8. A manufacturing method of a liquid crystal panel of claim 6, wherein an opaque film is formed by selective coating using micro-jet of organic resin containing either one or both of black pigment and dye.

9. A liquid crystal panel comprising an active substrate forming a plurality of scanning lines, at least one layer of insulating layer, and a plurality of signal lines nearly orthogonal to said scanning lines, sequentially on a principal plane of an insulating substrate, and having at least one switching element and reflection electrode at every intersection of said scanning lines and signal lines, a transparent insulating substrate or color filter substrate disposed oppositely to said active substrate, and liquid crystal contained in the spacing between said active substrate and said transparent insulating substrate or color filter substrate, wherein an opaque metal thin film having a thickness of under 0.3 $\mu$m is formed at a position corresponding to a specific unit pixel on a non-opposite side of said transparent insulating substrate or color filter substrate.

10. A manufacturing method of a liquid crystal panel comprising an active substrate forming a plurality of scanning lines, at least one layer of insulating layer, and a plurality of signal lines nearly orthogonal to said scanning lines, sequentially on a principal plane of an insulating substrate, and having at least one switching element and reflection electrode at every intersection of said scanning lines and signal lines, a transparent insulating substrate or color filter substrate disposed oppositely to said active substrate, and liquid crystal contained in the spacing between said active substrate and said transparent insulating substrate or color filter substrate, comprising:

detecting light point defects in image inspection at either the panel assembling step or mounting step, forming an opaque film having a thickness of under 0.3 $\mu$m at a position corresponding to said detected light point defect on either a non-opposite side of said transparent insulating substrate, or color filter substrate; and adhering a polarizer to the non-opposite side of said transparent insulating substrate or color filter substrate.

11. A manufacturing method of a liquid crystal panel of claim 10, wherein an opaque film of metal thin film is formed by laser CVD.

12. A manufacturing method of a liquid crystal panel of claim 10, wherein an opaque film is formed by using micro-jet of organic resin containing either one or both of black pigment and dye.

13. A liquid crystal panel comprising a transparent insulating substrate forming striped coloring layers and a plurality of transparent conductive scanning lines sequentially on a principal plane, an insulating substrate disposed oppositely to said transparent insulating substrate, forming a plurality of metallic signal lines on a principal plane, and liquid crystal contained in the spacing between said transparent insulating substrate and said insulating substrate, wherein an opaque film having a thickness of under 0.3 $\mu$m is formed at a position corresponding to a specific unit pixel on other principal plane of said transparent insulating substrate.

14. A manufacturing method of a liquid crystal panel comprising a transparent insulating substrate forming striped coloring layers and a plurality of transparent conductive scanning lines sequentially on a principal plane, and insulating substrate disposed oppositely to said transparent insulating substrate, forming a plurality of metallic signal lines on a principal plane, and liquid crystal contained in the spacing between said transparent insulating substrate and said insulating substrate, comprising:

detecting light point defects in image inspection after either panel assembling step, or mounting step;

forming an opaque film having a thickness of under 0.3 $\mu$m at a position corresponding to said detected light point defect on other principal plane of said transparent insulating substrate; and adhering a polarizer to the other principal plane of said transparent insulating substrate.

15. A manufacturing method of a liquid crystal panel of claim 14, wherein an opaque film of metal thin film is formed by laser CVD.

16. A manufacturing method of a liquid crystal panel of claim 14, wherein an opaque film is formed by using micro-jet of organic resin containing either one or both of black pigment and dye.

* * * * *